United States Patent
Vigilant et al.

(10) Patent No.: US 12,388,615 B2
(45) Date of Patent: Aug. 12, 2025

(54) METHOD FOR SECURING A MULTIPLE POINT MULTIPLICATION OPERATION AGAINST SIDE-CHANNEL ATTACKS

(71) Applicant: THALES DIS FRANCE SAS, Meudon (FR)

(72) Inventors: David Vigilant, Malakoff (FR); Steven Madec, Montigny le Bretonneux (FR); Mylène Roussellet, Saint Savournin (FR)

(73) Assignee: THALES DIS FRANCE SAS, Meudon (FR)

( * ) Notice: Subject to any disclaimer, the term of this patent is extended or adjusted under 35 U.S.C. 154(b) by 80 days.

(21) Appl. No.: 18/260,793

(22) PCT Filed: Jan. 11, 2022

(86) PCT No.: PCT/EP2022/050455
§ 371 (c)(1),
(2) Date: Jul. 10, 2023

(87) PCT Pub. No.: WO2022/148884
PCT Pub. Date: Jul. 14, 2022

(65) Prior Publication Data
US 2024/0313942 A1    Sep. 19, 2024

(30) Foreign Application Priority Data
Jan. 11, 2021   (EP) ..................................... 21305022

(51) Int. Cl.
*H04L 9/00* (2022.01)
*H04L 9/30* (2006.01)

(52) U.S. Cl.
CPC ............ *H04L 9/003* (2013.01); *H04L 9/3066* (2013.01); *H04L 2209/046* (2013.01)

(58) Field of Classification Search
CPC .. H04L 9/003; H04L 9/3066; H04L 2209/046
See application file for complete search history.

(56) References Cited

U.S. PATENT DOCUMENTS

| 8,391,477 B2 * | 3/2013 | Izu .......................... G06F 7/725 |
| | | 708/250 |
| 10,181,944 B2 * | 1/2019 | Audley ................. H04L 9/002 |
| (Continued) | | |

FOREIGN PATENT DOCUMENTS

EP    2119099 B1    10/2011

OTHER PUBLICATIONS

International Search Report (PCT/ISA/210) and Written Opinion (PCT/ISA/237) mailed on Apr. 28, 2022, by the European Patent Office as the International Searching Authority for current International Application No. PCT/EP2022/050455—[28 pages].

(Continued)

*Primary Examiner* — Beemnet W Dada

(57) ABSTRACT

Provided is a method for securing against side channel attacks. An elliptic curve cryptographic process comprises a multiple points multiplication operation using predetermined scalar values, Pi being points of an elliptic curve over a finite field defined by parameters (F, E, G, N) together with the point addition law where F is a field over which is defined the curve, E is an equation of the curve, G is a base point in E over F and N is the order of the base point G. The method comprises generating (S1) a masking value iRand, multiplicatively masking (S2) each predetermined scalar value $d_i$ with said generated masking value iRand to obtain masked scalars $d_i'$, computing (S3) a masked multiple points multiplication operation result, and obtaining (S4) said multiple points multiplication operation result R by unmasking said masked multiple points multiplication operation result R'.

7 Claims, 3 Drawing Sheets

(56) References Cited

U.S. PATENT DOCUMENTS

| | | | | |
|---|---|---|---|---|
| 11,018,865 B2* | 5/2021 | Soukharev | ............ | H04L 9/3066 |
| 2008/0301458 A1* | 12/2008 | Ebeid | .................... | H04L 9/3066 |
| | | | | 713/180 |
| 2016/0328542 A1* | 11/2016 | Hoogerbrugge | ......... | G06F 21/50 |
| 2016/0373248 A1* | 12/2016 | Audley | ................... | G06F 7/723 |

OTHER PUBLICATIONS

Ekambaram Kesavulu Reddy: "Elliptic Curve Cryptosystems and Side-channel Attacks", International Journal of Network Security, pp. 151-158, XP055201386, Retrieved from the Internet: URL:http://ijns.jalaxy.com.tw/contents/ijns-v12-n3/ijns-2011-v12-n3-p151-158.pdf [retrieved on Jul. 9, 2015] sections 2.1, 2.2, 3.2, 4.1, 4.2; pp. 2,4.
Jithra Adikari et al: "Fast Multiple Point Multiplication on Elliptic Curves over Prime and Binary Fields using the Double-Base Number System", IACR, International Association for Cryptologic Research, vol. 20080331:183219, Mar. 31, 2008 (Mar. 31, 2008), pp. 1-10, XP061002800, sections III. and III.A; p. 4.

\* cited by examiner

METHOD FOR SECURING A MULTIPLE POINT MULTIPLICATION OPERATION AGAINST SIDE-CHANNEL ATTACKS

FIELD

The present invention relates to the field of public key cryptography, and more particularly to a method for securing against side-channel attacks point multiplication operations performed in elliptic curve cryptographic processes.

BACKGROUND

Cryptographic algorithms are commonly used for ensuring the privacy of communications by encryption, for authentication or for generating a verifiable signature. Examples of such algorithms are AES, DES or DSA.

Such cryptographic algorithms are sensitive to side-channel attacks (SCA), based on an analysis of the power consumption or electromagnetic signature of the device performing the encryption, as depicted on FIG. 1.

Elliptic curve cryptography (ECC) protocols, such as ECDSA, are particularly vulnerable to SCA. Indeed, such protocols, in addition to a secret key, use other values called nonces for performing a cryptographic operation. For example a nonce may be used as the scalar value to perform a scalar point multiplication. And it has been demonstrated in "Attacking (ec) dsa given only an implicit hint" by J.-. Faugere et al in 2012 and even more recently in "Minerva: The curse of ECDSA nonces" in 2020 by J. Jancar et al that, even when operations manipulating the secret key are protected against SCA, ECC protocols remain sensitive to such attacks: retrieving a few bits of the nonce by a SCA may enable an attacker to retrieve the full secret key by performing a lattice basis reduction attack. Therefore, there is a need for a better protection of ECC protocols against SCA.

Such a problem of protecting against SCA ECC operations using nonces is particularly important when performing multiple point multiplications which use multiple nonces at the same time in a single operation.

As a result, there is a need for a method securing ECC processes against side channel attacks. Such a method shall be applicable and efficient when such processes perform multiple point multiplications.

SUMMARY

For this purpose and according to a first aspect, this invention therefore relates to a method for securing against side channel attacks an execution of an elliptic curve cryptographic process comprising a multiple points multiplication operation computing a multiple points multiplication operation result $R=\Sigma_{i=1}^{n} d_i \cdot P_i$ with n an integer, n>=1, $d_i$ being predetermined scalar values, $P_i$ being points of an elliptic curve over a finite field defined by parameters (F, E, G, N) together with the point addition law where F is a field over which is defined the curve, E is an equation of the curve, G is a base point in E over F and N is the order of the base point G, said method being performed by a cryptographic device and comprising:
  generating a masking value iRand,
  multiplicatively masking each predetermined scalar value $d_i$ with said generated masking value iRand to obtain masked scalars $d_i'$ with i in $\{1, \ldots, n\}$,
  computing a masked multiple points multiplication operation result $R'=\Sigma_{i=1}^{n} d_i' \cdot P_i$ with i in $\{1, \ldots, n\}$,
  obtaining said multiple points multiplication operation result R by unmasking said masked multiple points multiplication operation result R'.

Such a method enables to protect the predetermined scalar values in a way that allows an easy unmasking of the multiple points multiplication operation result after point multiplications have been summed up.

In an embodiment,
  the step of generating a masking value iRand comprises generating a random value Rand and computing the masking value iRand by inverting the random value Rand (iRand=1/Rand mod N); and
  the step of unmasking said masked multiple points multiplication operation result R' comprises multiplying said masked multiple points multiplication operation result R' with said generated random value Rand.

By doing so, the masking can be cancelled by a single operation at the end of the computation process.

In an embodiment, the step of computing the masked multiple points multiplication operation result R' comprises:
  precomputing all possible sums $R_k=\Sigma_{i=1}^{n} a_i \cdot P_i$, for $a_i$ in $[0, 2^w-1]$, with w a predetermined integer w>=1,
  initializing an intermediate value A at the infinity point,
  for an integer j from 0 to |B|−w by steps w, with B a number of bits of the predetermined scalar values:
    a. multiplying said intermediate value A by $2^w$
    b. selecting a sum $R_m$ among said precomputed possible sums $R_k$ such that: $R_m = \Sigma_{i=1}^{n}(d_{i,j}'| \ldots |d_{i,j+w-1}') \cdot P_i$ with $d_{i,j}'$ the $j^{th}$ bit of $d_i'$,
    c. adding said selected sum $R_m$ to said intermediate value A.

Such a method enables to minimize the computation time and effort by relying on precomputed values, while constantly protecting the predetermined scalars $d_i$ against side channel attacks.

Said random value size may be 32 or 64 bits. Such a reduced size of the random value limits the cost of unmasking without reducing the size of the masking value iRand.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a non-transitory computer readable medium storing executable computer code that when executed by a cryptographic device comprising a processing system having at least one hardware processor performs the steps of the methods according to the first aspect.

According to a fourth aspect, this invention therefore relates also to a cryptographic device comprising:
  at least one Non Volatile Memory and/or a read-only memory,
  a processing system having at least one hardware processor configured to execute the steps of the method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

The invention aims at securing against side channel attacks an execution of an elliptic curve cryptographic process comprising a multiple points multiplication 10 operation.

Figure 1:
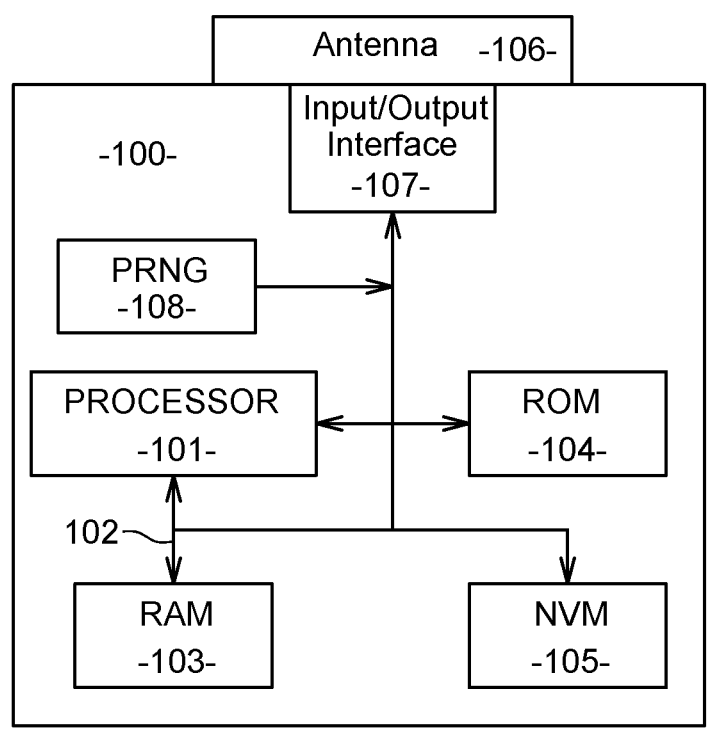
FIG. 1 is a schematic illustration of a system comprising a cryptographic device according to an embodiment of the present invention.

Such a process may be performed by a cryptographic device 100 a schematic illustration of which is given on FIG. 1. The cryptographic device 100 may include a processor 101 connected via a bus 102 to a random access memory (RAM) 103, a read-only memory (ROM) 104, and/or a non-volatile memory (NVM) 105. The cryptographic device 100 may further include a communication interface 106 by which the cryptographic device 100 may be connected to a network. Such an interface may be a wireless interface connected to an antenna and may be used to connect the cryptographic device 100 to various forms of wireless networks, e.g., wide-area networks, WiFi networks, or mobile telephony networks. Alternatively, such an interface may be a wired interface such as an Ethernet internet. The cryptographic device 100 may also include input/output means 107 providing interfaces to the user of the cryptographic device 100, such as one or more screens, loudspeakers, a mouse, tactile surfaces, a keyboard etc. . . .

Such a cryptographic device may for example be a smartcard, a mobile telephone, a tablet, or a personal computer. It may also be a smartchip embedded in an identity document such as a passport, or a Hardware Security Module (HSM).

The elliptic curve cryptographic process performed by the cryptographic device may for example be ECDSA protocol which performs multiple point multiplications in protocols.

A multiple points multiplication operation computes a multiple points multiplication operation result $R=\Sigma_{i=1}^{n} d_i \cdot P_i$ with n an integer, n>=1, $d_i$ being predetermined scalar values, $P_i$ being points of an elliptic curve over a finite field defined by parameters (F, E, G, N) together with the point addition law where F is a field over which is defined the curve, E is an equation of the curve, G is a base point in E over F and N is the order of the base point G. The symbol "·" represents the point multiplication, where d·P means calculating d times the point addition group law P+P+ . . . +P, whereas the symbol "*" represents a multiplication between integers. The calculation of the rest after a Euclidian division by some integer, also called modulo, is noted "mod".

The predetermined scalar values $d_i$ to be used for such a computation are called nonces. As introduced above, such nonces shall be protected from Side Channel Attacks in order to protect the secret key of the cryptographic process.

The main idea of the invention is to protect the nonces from being guessed by an attacker from SCA traces by applying a multiplicative masking to these nonces before performing the multiple points multiplication operation. A problem is then to be able to remove the masking from the multiple points multiplication operation output in order to obtain the unmasked multiple points multiplication operation result $R=\Sigma_{i=1}^{n} d_i \cdot P_i$. In order to do so, the method according to the invention uses a single mask for masking all the nonces to be used in the same multiple points multiplication operation. By doing so, this mask can be factorized from the multiple points multiplication operation output and the masking can be easily removed by a single operation.

Figure 2:
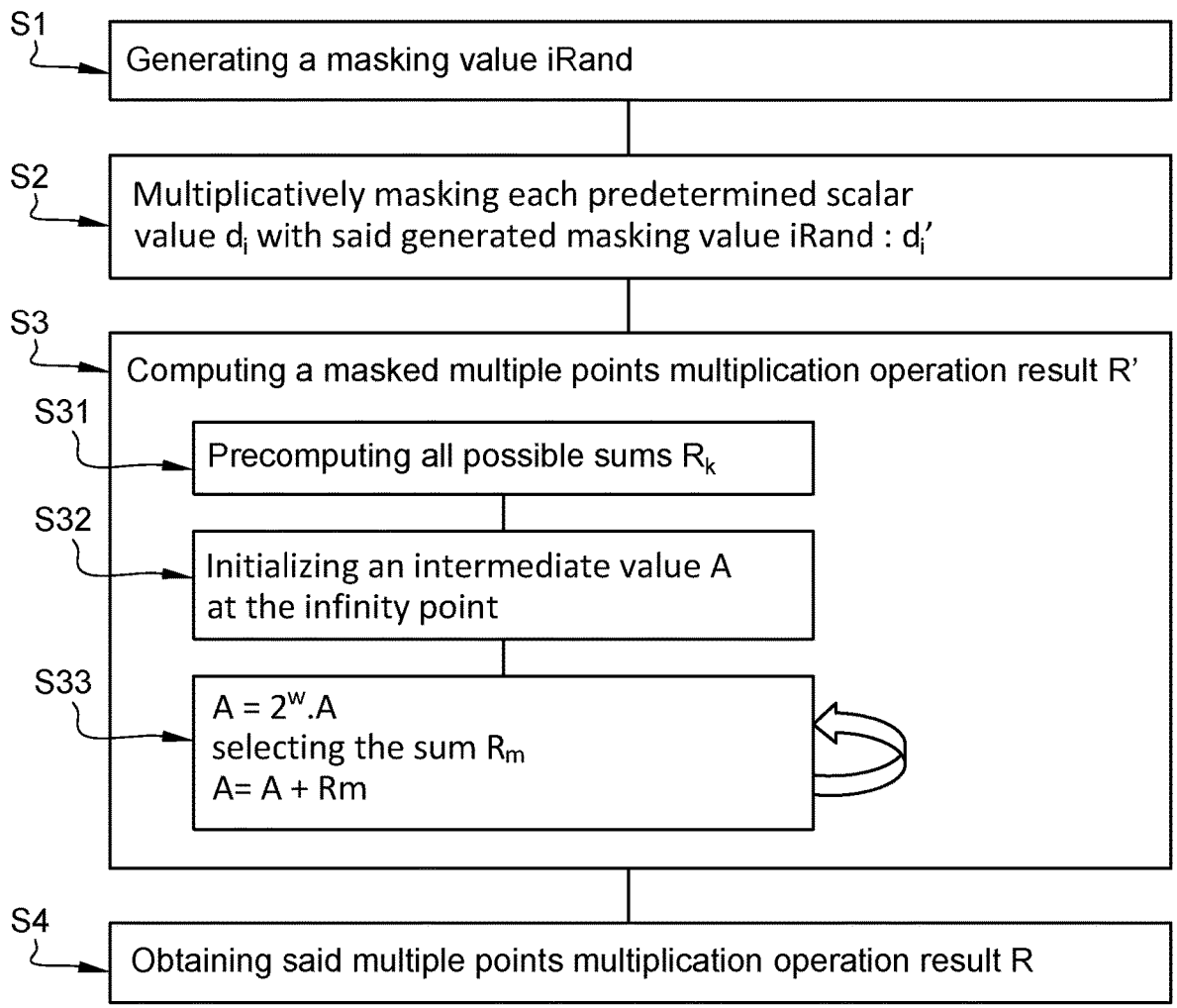
FIG. 2 illustrates schematically a method for securing against side channel attacks an execution of an elliptic curve cryptographic process comprising a multiple points multiplication operation according to an embodiment of the present invention.

The following paragraphs describe with more details the steps of a method according to the invention securely computing a multiple points multiplication operation result $R=\Sigma_{i=1}^{n} d_i \cdot P_i$, as depicted on FIG. 2.

In a first step S1, the cryptographic device generates a masking value iRand. Such a value may be randomly generated, for example by a Pseudo-Random Number Generator PRNG 108 included in the cryptographic device.

In a second step S2, the cryptographic device multiplicatively masks each predetermined scalar value $d_i$ with said generated masking value iRand to obtain masked scalars $d_i'$ with i in $\{1, \ldots, n\}$: $d_i' = iRand * d_i \mod N$.

In a third step S3, the cryptographic device computes a masked multiple points multiplication operation result $R'=\Sigma_{i=1}^{n} d_i' \cdot P_i$ with i in $\{1, \ldots, n\}$. The computation of this result R' is the computation of the result $R=\Sigma_{i=1}^{n} d_i \cdot P_i$ to be computed, except that each predetermined scalar value $d_i$ has been replaced by its masked value $d_i'$.

In a fourth step S4, the cryptographic device obtains said multiple points multiplication operation result R by unmasking said masked multiple points multiplication operation result R'. Since the same masking value iRand is used to mask all terms $d_i \cdot P_i$ it can be easily factorized and cancelled.

In one embodiment, in the first step S1, generating a masking value iRand comprises generating a random value Rand and computing the masking value iRand by inverting the random value Rand: iRand=1/Rand mod N. Such a random value may have a size of 32 bits or 64 bits for example.

In such an embodiment, in the fourth step S4, unmasking said masked multiple points multiplication operation result R' comprises multiplying said masked multiple points multiplication operation result R' with said generated random value Rand. Indeed, Rand·R'=Rand. $\Sigma_{i=1}^{n} d_i' \cdot P_i$=Rand. $\Sigma_{i=1}^{n}$ (iRand*$d_i$)·$P_i$=(Rand*iRand). $\Sigma_{i=1}^{n} d_i \cdot P_i$=R.

Unmasking the masked multiple points multiplication operation result R' in such a way and using a limited size random value Rand minimizes the cost of the operations performed at the fourth step and ensures a good performance.

The following paragraphs described an exemplary embodiment for computing the masked multiple points multiplication operation result R' in the third step S3. The idea of this embodiment is to compute the result by chunks of a predetermined length w bits of the masked predetermined scalars $d_i'$, and to precompute all the possible chunks to avoid performing any point multiplication at the time the multiple points multiplication computation is requested.

In a first substep S31, all possible sums $R_k=\Sigma_{i=1}^{n} a_i \cdot P_i$, for $a_i$ in $[0, 2^w-1]$, with w a predetermined integer w>=1 are precomputed. Said otherwise, a sum $R_k$ is computed for each possible value of the array $(a_1, \ldots, a_i, \ldots, a_n)$ where each $a_i$, with i in $\{1, \ldots, n\}$, can be equal to any value in $[0, 2^w-1]$. The number of precomputed sums $R_k$ is equal to $2^{n*w}$.

Such a precomputation may be performed before performing any other step of the method since it does not depend on the predetermined scalar values $d_i$. It may be performed by the cryptographic device itself or performed by another device such as a server and the computed sums may be transferred to the cryptographic device.

In a second substep S32, the cryptographic device initializes an intermediate value A at the infinity point.

In a third substep S33, the cryptographic device:
multiplies the intermediate value A by $2^w$:

$$A = 2^w \cdot A$$

selects the sum $R_m$ among the precomputed possible sums $R_k$ such that:
$R_m = \Sigma_{i=1}^n (d'_{i,j} | \ldots | d'_{i,j+w-1}) \cdot P_i$ with $d'_{i,j}$ the $j^{th}$ bit of the masked predetermined scalar $d_i'$.

In this formula $(d'_{i,j} | \ldots | d'_{i,j+w-1})$ represents the mathematical evaluation in base 2 of the string formed by concatenating bits j to j+w−1 of $d_i'$ expressed in base 2. At the first execution of this step, the index j is equal to 0.

adds the selected sum $R_m$ to the intermediate value A $$A = A + R_m$$

increases j by w.

This substep S33 is repeated for the new value of the index j until j reaches |B|−w, which is the last value of j for which the substep is performed, with B the numbers of bits of $d_i'$. When |B| is not a multiple of w, when j becomes bigger than |B|−w, this substep is repeated one last time after replacing w by |B|−j. This enables to take into account the last bits of the predetermined scalars when there are less than w bits left to be taken into account.

Figure 3:
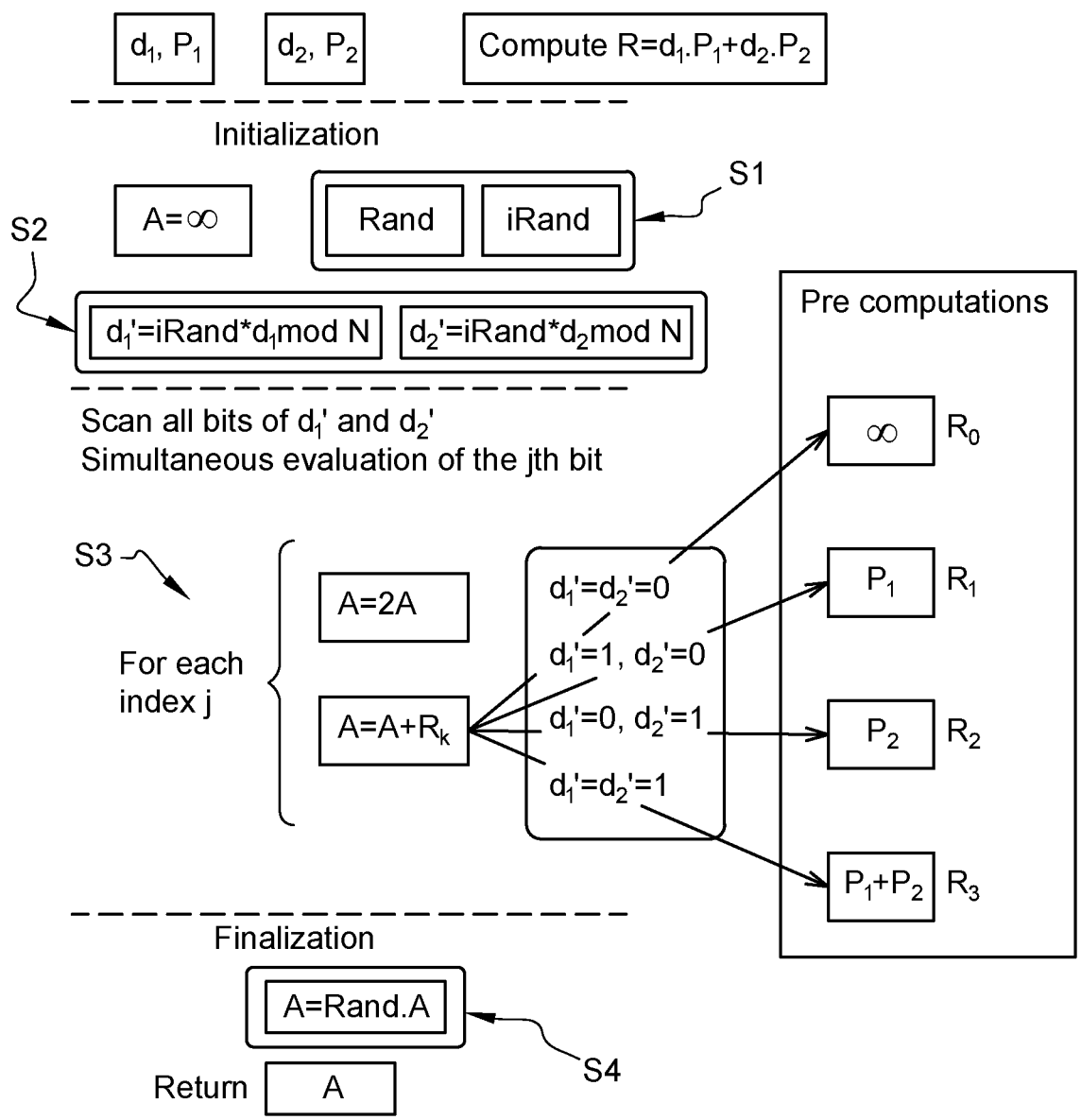
FIG. 3 illustrates schematically an example of implementation of a method for securing against side channel attacks an execution of an elliptic curve cryptographic process comprising a multiple points multiplication operation according to an embodiment of the present invention (when n=2 and w=1).

FIG. 3 shows an example of implementation when n=2 and w=1.

In this case, the multiple points multiplication result to be obtained is $R = d_1 \cdot P_1 + d_2 \cdot P_2$.

In the first substep S31, the all possible sums $R_k = \Sigma_{i=1}^n a_i \cdot P_i$, for $a_i$ in [0, 1], are precomputed. In this case, it means precomputing sums for (a1; a2)=(0;0); (0;1), (1;0) and (1;1) which only amounts to computing $P_1+P_2$ since the sum for the other combinations are already known.

In the first step S1, the cryptographic device generates a random value Rand and computes the masking value iRand by inverting the random value Rand.

In the second step S2, the cryptographic device multiplicatively masks the predetermined scalar value $d_1$ and $d_2$ with the generated masking value iRand to obtain masked scalars $d_1'$=iRand*$d_1$ mod N and $d_2'$=iRand*$d_2$ mod N.

In the third step S3, the cryptographic device computes the masked multiple points multiplication operation result $R' = \Sigma_{i=1}^n d_i' \cdot P_i$ by repeating the third substep S33 for each value of j in $\{0, \ldots, B-1\}$ and selecting at each iteration the precomputed value to be added to the intermediate value A, depending on the value of the bits $d'_{i,j}$.

In the fourth step S4, the cryptographic device multiplies the masked multiple points multiplication operation result R' with the generated random value Rand to obtain the multiple points multiplication operation result R.

As a result, the method described above enables to compute securely a multiple points multiplication operation, without exposing to side channel attacks the nonces used as scalars for the point multiplications.

The invention claimed is:

1. A method for securing against side channel attacks via execution of an elliptic curve cryptographic process comprising a multiple points multiplication operation computing a multiple points multiplication operation result $R = \Sigma_{i=1}^n d_i \cdot P_i$ with n an integer, n>=1, $d_i$ being predetermined scalar values, $P_i$ being points of an elliptic curve over a finite field defined by parameters (F, E, G, N) together with the point addition law where F is a field over which is defined the curve, E is an equation of the curve, G is a base point in E over F and N is the order of the base point G,
said method being performed by a cryptographic device and comprising:
generating (S1) a masking value iRand;
multiplicatively masking (S2) each predetermined scalar value $d_1$ with said generated masking value iRand to obtain masked scalars $d_i'$ with i in $\{1, \ldots, n\}$;
computing (S3) a masked multiple points multiplication operation result $R' = \Sigma_{i=1}^n d_i' \cdot P_i$ with i in $\{1, \ldots, n\}$; and
obtaining (S4) said multiple points multiplication operation result R by unmasking said masked multiple points multiplication operation result R'.

2. The method of claim 1,
wherein generating a masking value iRand comprises generating a random value Rand and computing the masking value iRand by inverting the random value Rand (iRand=1/Rand mod N); and
wherein unmasking said masked multiple points multiplication operation result R' comprises multiplying said masked multiple points multiplication operation result R' with said generated random value Rand.

3. The method of claim 1, wherein computing the masked multiple points multiplication operation result R' comprises:
precomputing (S31) all possible sums $R_k = \Sigma_{i=1}^n a_i \cdot P_i$, for $a_i$ in $[0, 2^w-1]$, with w a predetermined integer w>=1;
initializing (S32) an intermediate value A at the infinity point; and
for an integer j from 0 to |B|-w by steps w (S33), with B a number of bits of the predetermined scalar values:
a. multiplying said intermediate value A by $2^w$
b. selecting a sum $R_m$ among said precomputed possible sums $R_k$ such that:

$$Rm = \sum_{i=1}^{n} (d'_{ij} | \ldots | d'_{ij+w-1}) \cdot P_i$$

with $d_{ij}'$ the $j^{th}$ bit of $d_i'$,
c. adding said selected sum Rm to said intermediate value A.

4. The method of claim 3, wherein said random value size is 32 or 64 bits.

5. The method of claim 2 is enabled by a computer program product directly loadable into a memory of at least one computer, comprising software code instructions for performing steps of the method when said product is run on a computer.

6. The method of claim 5, wherein a non-transitory computer readable medium storing the software code that when executed by a cryptographic device comprising at least one hardware processor performs the method.

7. A cryptographic device comprising:
a processing system having at least one hardware processor; and
at least one Non Volatile Memory and/or a read-only memory;

wherein the cryptographic device
secures against side channel attacks via execution of an elliptic curve cryptographic process comprising a multiple points multiplication operation computing a multiple points multiplication operation result $R=\Sigma_{i=1}^{n} d_i \cdot P_i$ with n an integer, n>=1, $d_i$ being predetermined scalar values, $P_i$ being points of an elliptic curve over a finite field defined by parameters (F, E, G, N) together with the point addition law where F is a field over which is defined the curve, E is an equation of the curve, G is a base point in E over F and N is the order of the base point G, wherein the cryptographic device:
generates (S1) a masking value iRand;
multiplicatively masks (S2) each predetermined scalar value $d_1$ with said generated masking value iRand to obtain masked scalars $d_i'$ with i in $\{1 \ldots, n\}$;
computes (S3) a masked multiple points multiplication operation result $R'=\Sigma_{i=1}^{n} d_i' \cdot P_i$ with i in $\{1 \ldots n\}$; and
obtains (S4) said multiple points multiplication operation result R by unmasking said masked multiple points multiplication operation result R'.

\* \* \* \* \*